(12) United States Patent
Mitchell et al.

(10) Patent No.: US 7,333,645 B1
(45) Date of Patent: Feb. 19, 2008

(54) MULTIPLE IMAGE FUSION

(75) Inventors: Richard A. Mitchell, Springboro, OH (US); Michael J. Collins, Beavercreek, OH (US)

(73) Assignee: iCAD, Inc., Beavercreek, OH (US)

( * ) Notice: Subject to any disclaimer, the term of this patent is extended or adjusted under 35 U.S.C. 154(b) by 639 days.

(21) Appl. No.: 10/973,837

(22) Filed: Oct. 26, 2004

Related U.S. Application Data (60) Provisional application No. 60/524,838, filed on Nov. 25, 2003.

(51) Int. Cl.
*G06K 9/00* (2006.01)
(52) U.S. Cl. .................. 382/128; 382/132; 128/920; 128/922
(58) Field of Classification Search ............... 382/128, 382/129, 130, 131, 132, 133, 134; 600/300; 378/4, 37, 901; 128/920, 922
See application file for complete search history.

(56) References Cited

U.S. PATENT DOCUMENTS 6,056,690 A * 5/2000 Roberts ................. 600/300
6,075,879 A * 6/2000 Roehrig et al. ............ 382/132

OTHER PUBLICATIONS

Kevin Murphy; Bayes Net Toolbox for Matlab; Jun. 9, 2004; http://www.ai.mit.edu/~murphyk/Software/BNT/bnt.html.
Arthur M. Breipohl; An Introduction to Probabilistic Models, Decisions, and Applications of Random Processes; Probabilistic Systems Analysis; Copyright 1970; pp. 26-35; John Wiley & Sons, Inc.

* cited by examiner

*Primary Examiner*—Samir Ahmed
*Assistant Examiner*—Abolfazl Tabatabai
(74) *Attorney, Agent, or Firm*—Foley Hoag LLP (57) ABSTRACT

The method and system for exploiting information from multiple images in a mammographic computer-aided detection application is disclosed. A pair of images is obtained by a CAD system. The images are processed to produce a set of regions of interest (ROIs) to be associated with each image. A ROI is selected from the first image of the pair. This ROI is identified and matched to a ROI in the second image. The single image feature values are obtained by the two ROIs of the image pair. Transforming the image feature value to an integer value produces a pair of integers for each image feature value. The pair of integers defines the element of the pre-determined co-occurrence matrix. An element of a pre-determined co-occurrence matrix is selected to provide evidence value for the ROI of the first image.

25 Claims, 11 Drawing Sheets

Figure 8(a) ipsilateral

Figure 8(b) contralateral

Figure 8(c) prior

Figure 11(a)
Current

Figure 11(b)
Prior

MULTIPLE IMAGE FUSION

CROSS-REFERENCE TO RELATED APPLICATIONS

This application claims the benefit of U.S. Provisional Application No. 60/524,838 filed Nov. 25, 2003 which is incorporated herein by reference.

BACKGROUND OF THE INVENTION

1. Field of the Invention

This invention relates to a method and system for fusing information from multiple images and, in particular, relates to a method for fusing information from multiple images in a mammographic computer-aided detection (CAD) system.

2. Discussion of Background

Breast cancer is the second most common cancer among women, after non-melanoma skin cancers. Currently, slightly more than two million women living in the United States have been diagnosed with and treated for breast cancer. More than 1.2 million people will be diagnosed with breast cancer this year worldwide according to the World Health Organization. In the United States alone, the American Cancer Society estimates that in 2004, approximately 215,990 women will be diagnosed with invasive breast cancer (Stages I-IV) and another 59,390 women will be diagnosed with in situ breast cancer, a very early form of the disease. Further, an estimated 1450 cases of breast cancer will be diagnosed in men in 2004.

Additionally, breast cancer is the second leading cause of cancer death in women, exceeded only by lung cancer. In 2004, about 40,110 women and 470 men will die from breast cancer in the United States. However, the good news is the death rates from breast cancer have declined significantly between 1992 and 1996, with the largest decreases coming from younger women under the age of fifty. Medical experts attribute the decline in breast cancer deaths to better detection and more effective treatments at an earlier stage. The early detection of breast cancer helps reduce the need for therapeutic treatment and minimizes pain and suffering, which allows women to continue to lead happy and productive lives.

Mammography has improved detection rates—and therefore survival rates—over the past several decades. More women than ever are being screened by mammography. In 1987, twenty-nine percent of American women surveyed said they received a mammogram every two years, versus seventy percent in 2000. Further, in 2000, sixty-three percent of American women said they were going for a mammogram every year. This increased usage has translated into more early cancers being diagnosed, which in turn has translated into better survival odds. According to the American Cancer Society, when breast cancer is confined to the breast, the survival rate is close to 100%. A woman with invasive carcinoma today is thirty-nine percent less likely to die from her disease than she would have been back in the 1980s. Most of the decrease can be attributable to screening mammography.

Screening mammography is used to look for breast disease in women who are asymptomatic, that is, they appear to have no breast problems. Screening mammography commonly provides two views (x-ray pictures) of each breast, cranio-caudal (CC) and medial-lateral oblique (MLO). In a CC view, the breast is compressed between paddles that are oriented parallel to the axial plane. In a MLO view, the compression paddles are oriented in a plane obtained by rotating the sagittal plane towards the axial plane by approximately 30 degrees. These standard views are used in the vast majority of screening exams in the United States.

Over the past two decades, CAD systems have been developed to help radiologists detect suspicious abnormalities on mammograms. This is accomplished most commonly with screen-film mammography and less often with digital mammography. Early research results suggest that CAD systems help radiologists diagnose more early stage cancers than mammography alone, especially in some of the threshold cases. The CAD system, in essence, functions as a second reader of the mammographic images. The CAD system marks regions on the image that indicate areas of interest such as, for example converging lines and shadows indicating a possible spiculated mass, densities with irregular margins that may indicate the onset of cancer and clusters of bright spots that may be malignant cancer. Therefore, one of the objectives of a mammographic CAD system is to indicate to the radiologist the tissue regions that need medical attention while leaving normal tissue unmarked.

One way to improve CAD performance is to exploit information from the multiple images obtained from a typical mammography examination. Additionally, information can be obtained by incorporating images from a prior mammographic examination with information with the current examination.

Therefore, a need exists for a method to improve performance of CAD systems by fusing image information from all images of the current examination as well as from images of previous mammographic examinations.

SUMMARY OF THE INVENTION

When a set of images is available in a mammographic CAD application, it is advantageous to incorporate evidence from across the set when determining CAD detections in order to estimate the likelihood of malignancy of an imaged region. A pair of images is obtained by a CAD system. The images are processed to produce a set of regions of interest (ROIs) to be associated with each image in the pair. A ROI is selected from the first image of the pair. This ROI is identified and matched to a ROI in the second image. Then, the single image feature values are obtained for the two ROIs of the image pair. Transforming the image feature values to integer values produces a pair of integers for each image feature value. This pair of integers defines an element of the pre-determined co-occurrence matrix. An element of a predetermined co-occurrence matrix is selected to provide an evidence value for the ROI of the first image.

Accordingly, it is an object of the present invention to fuse information from multiple current images in a mammographic CAD system.

It is another object of the present invention to fuse information from multiple images from both a current and a previous examination in a mammographic CAD system.

It is still another object of the present invention to fuse information from multiple ipsilateral images from a current examination in a mammographic CAD system.

It is yet another object of the present invention to fuse information from multiple contralateral images from a current examination in a mammographic CAD system.

Other objects and advantages of the present invention will be apparent in light of the following description of the invention embodied herein.

BRIEF DESCRIPTION OF THE DRAWINGS

The following detailed description of specific embodiments of the present invention can be best understood when read in conjunction with the following drawings, where like structure is indicated with like reference numerals, and in which.

DETAILED DESCRIPTION OF THE PREFERRED EMBODIMENTS

In the following detailed description of the preferred embodiments, reference is made to the accompanying drawings that form a part hereof, and in which are shown by way of illustration, and not by way of limitation, specific preferred embodiments in which the invention may be practiced. It is to be understood that other embodiments may be utilized and that logical, mechanical and electrical changes may be made without departing from the spirit and scope of the present invention.

Figure 1:
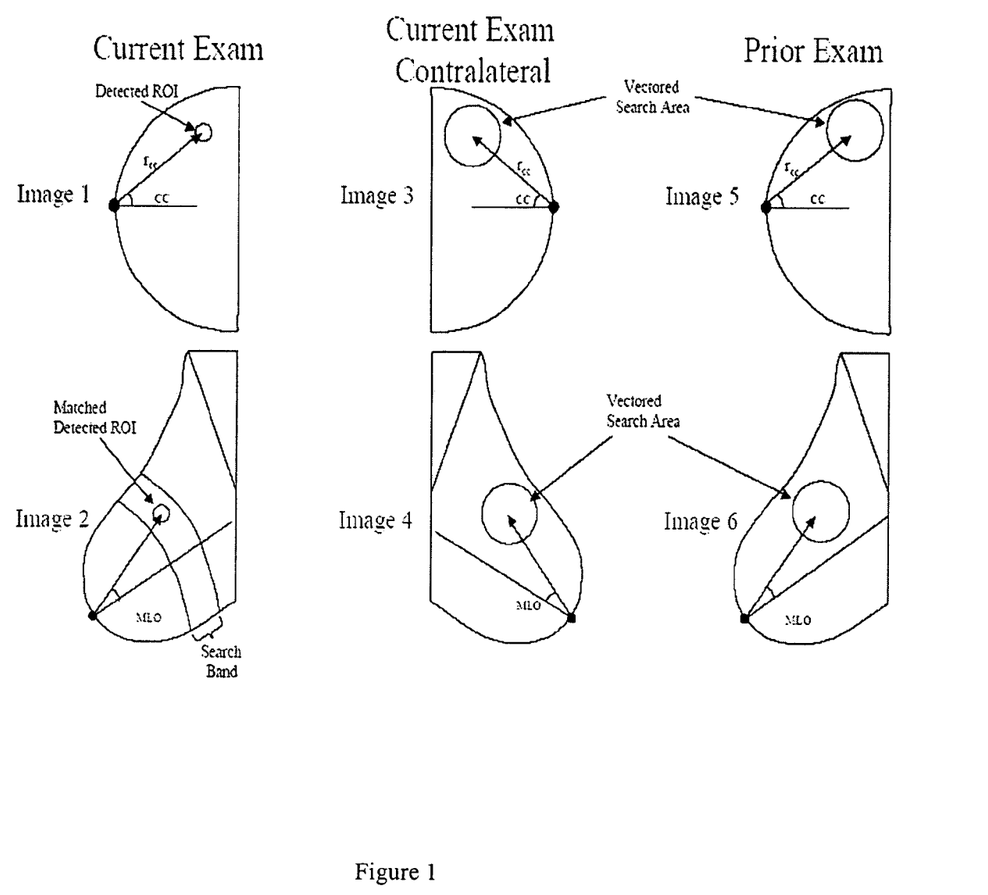
FIG. 1 depicts images used in the multi-image fusion method according to an embodiment of the present invention.

According to the present invention, a multi-image fusion CAD system considers up to six images at a time. The six images comprise the CC and MLO views from the left and right breasts from the current examination as well as the two prior examination ipsilateral CC and MLO views of the breast, as shown in FIG. 1. In FIG. 1, the right breast is considered the "breast under examination," and all fusion information generated will be related to that breast. Similarly, the left breast will be under examination by swapping each breast view with the corresponding contralateral view. Each image will have associated single image CAD ROIs that have been assigned a probability of cancer as well as other ROI features such as, for example, calcification, spiculation, roughness, and shape, obtainable by CAD systems known in the art.

The detection shown in Image 1 of FIG. 1 is considered the current ROI. The portion of the ipsilateral breast shown in Image 2 of FIG. 1 that contains the same tissue associated with the current ROI is searched for CAD detections. Detections found in the search region of the ipsilateral breast are ipsilateral matched ROIs. Similarly, detections found in the search region of the contralateral breast are contralateral matched ROIs. Finally, the same view in the prior exam is searched for prior matched ROIs.

Two different search modes are used in ROI matching: radial nipple distance and nipple vector matching. Radial nipple distance matching is used for ipsilateral matching, all other matching is nipple vector based. These two types of matching are also illustrated in FIG. 1.

The nipple distance search mode matching generates matched ROIs based solely on the difference in nipple distance between two ROIs being smaller than some specified gating distance, such as 1 cm. In nipple vector search mode matching, the matching region of support is determined by both the nipple distance and nipple angle. Any ROI that falls in a neighborhood about this vectored location generates a matched ROI.

Figure 2:
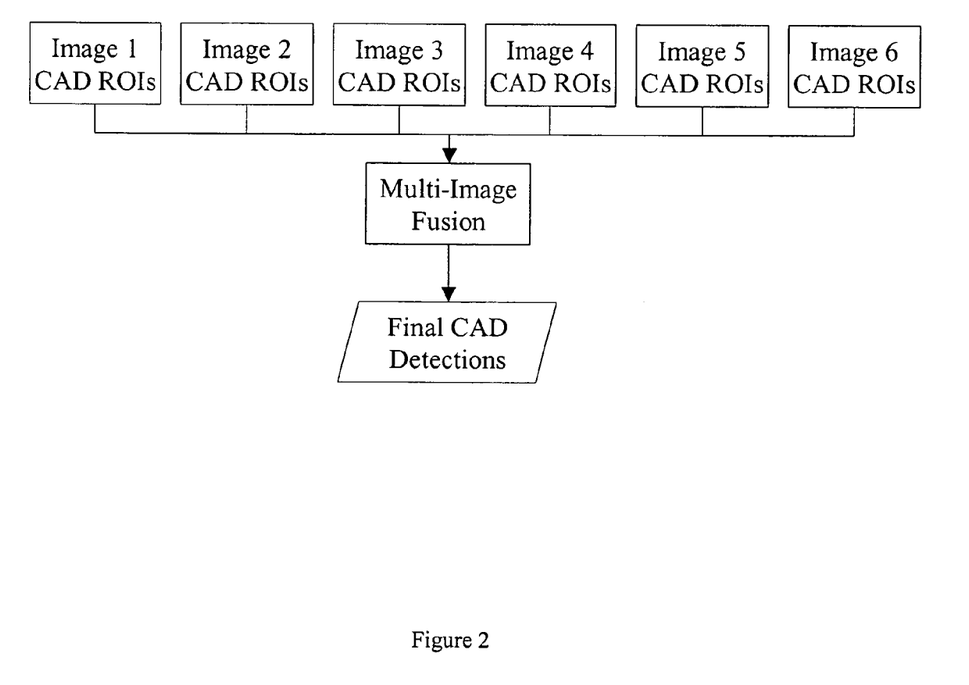
FIG. 2 is a block diagram of the multi-image fusion method according to an embodiment of the present invention.

FIG. 2 illustrates a block diagram where information from all six of the specified images are used to update the level of suspiciousness of malignancy for a set of ROIs. In one embodiment of the present invention, the fusion approach is a Bayesian Belief Network, which implements Bayesian reasoning. One especially useful feature of Bayesian Belief Networks is that they do not require all information sources to be present to function correctly. This property is important in the present invention since information will regularly be missing due to the regular occurrence of unavailable prior exam images or the lack of multi-image ROI correspondence.

Bayesian Belief Network Fusion

Figure 3:
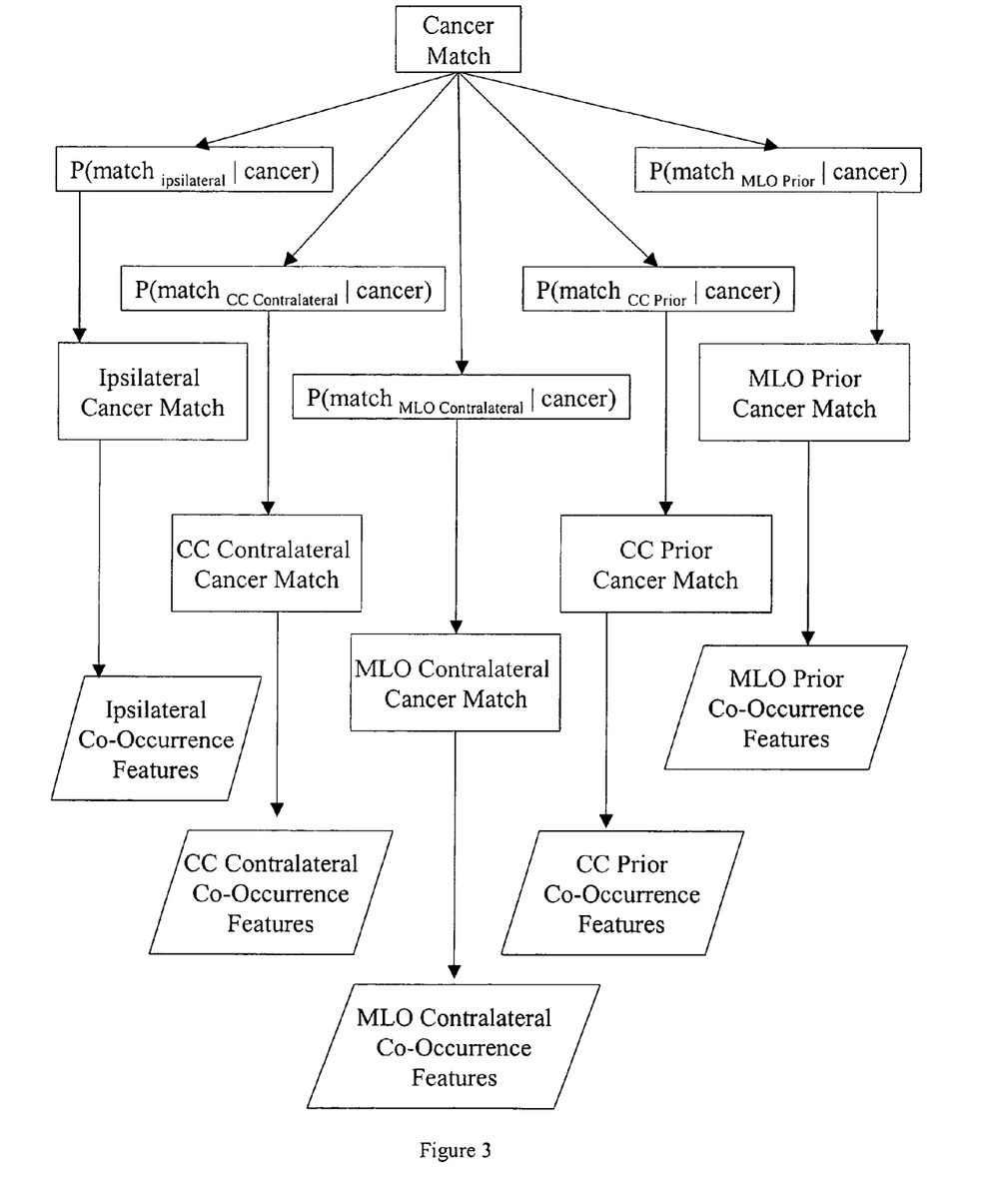
FIG. 3 shows a top level Bayesian Belief Network topology according to an embodiment of the present invention.

The Bayesian Belief Network topology used to integrate information from multiple images is shown in FIG. 3. A Bayesian Belief Network defines various events, the dependencies between them, and the conditional probabilities involved in those dependencies. A Bayesian Belief Network uses this information to calculate the probabilities of various possible causes being the actual cause of an event. The match inputs to the network are comprised of sub-networks of the form shown in FIG. 4. The sub-networks are broken out separately in these figures for display purposes only; effectively there is a single large network. The top level of the network, as shown in FIG. 3, integrates information from all available views and determines the probability of cancer for the multiple image matching system. The probability of cancer for an ROI is then updated using Bayes' equation, see Equation 1:

$$P_{fused}(c_k) = \frac{P_{initial}(c_k)P_{multi-image}(c_k)}{\sum_{j=0}^{1} P_{initial}(c_j)P_{multi-image}(c_j)} \quad (1)$$

where $c_k$ is the cancer state, k=0 for not cancer and k=1 for cancer, $P_{initial}(c_k)$ is the original probability of cancer state for an ROI as assigned by a first CAD processing step, $P_{multi-image}(c_k)$ is the probability of cancer state resulting from the multiple image fusion, and $P_{fused}(c_k)$ is the fused probability of cancer for the ROI, which takes into consideration the initial CAD system probability and multi-image probability.

Figure 4:
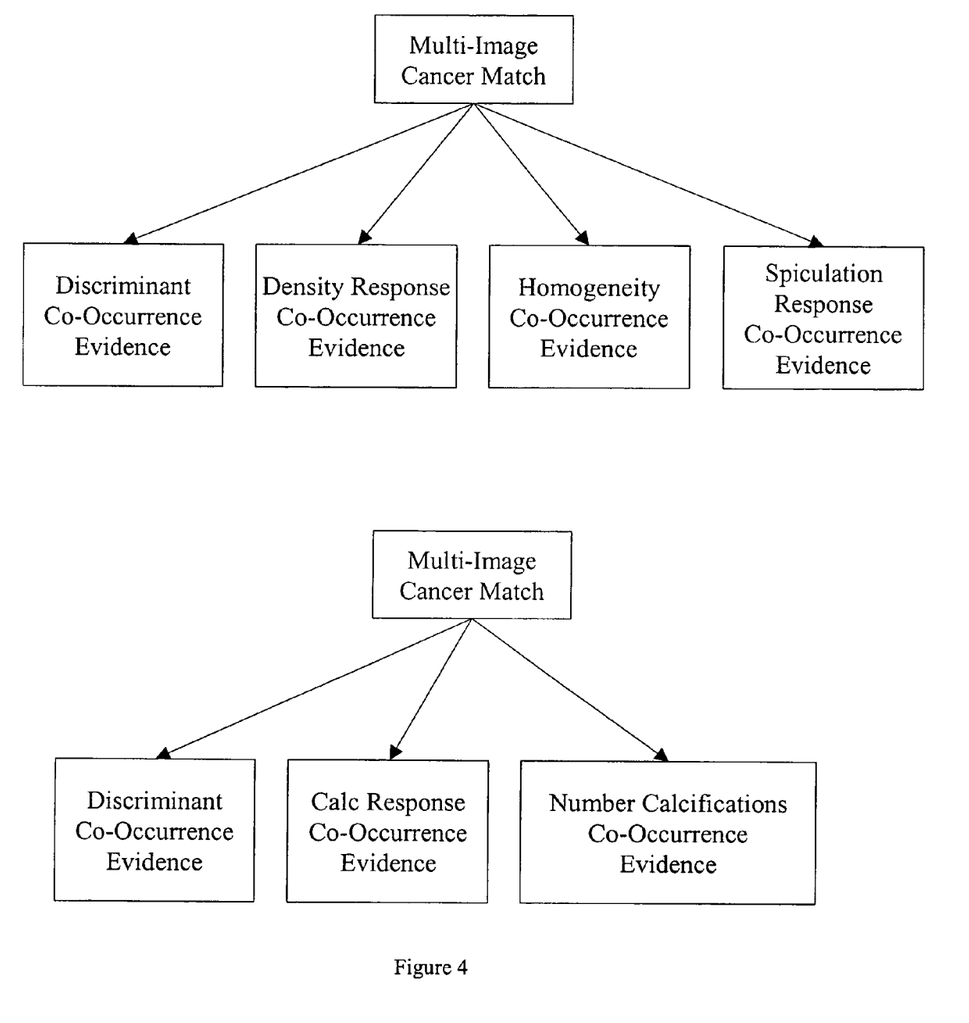
FIG. 4 shows a feature co-occurrence Bayesian Belief Network sub-network topology according to an embodiment of the present invention.

For each matched image pair, features from matching ROIs are evaluated within the sub-network illustrated in FIG. 4. In FIG. 4, different features are shown depending on the type of detection being used, microcalcifications, densities or any other detection type. The features shown are examples beneficial for the detection of microcalcifications and densities, but different feature sets may be used as known in the art. The evidence supplied to these feature blocks are derived from feature co-occurrence of matched ROIs. An explanation of this evidence, and how it is derived, is provided in the next section.

Figure 5:
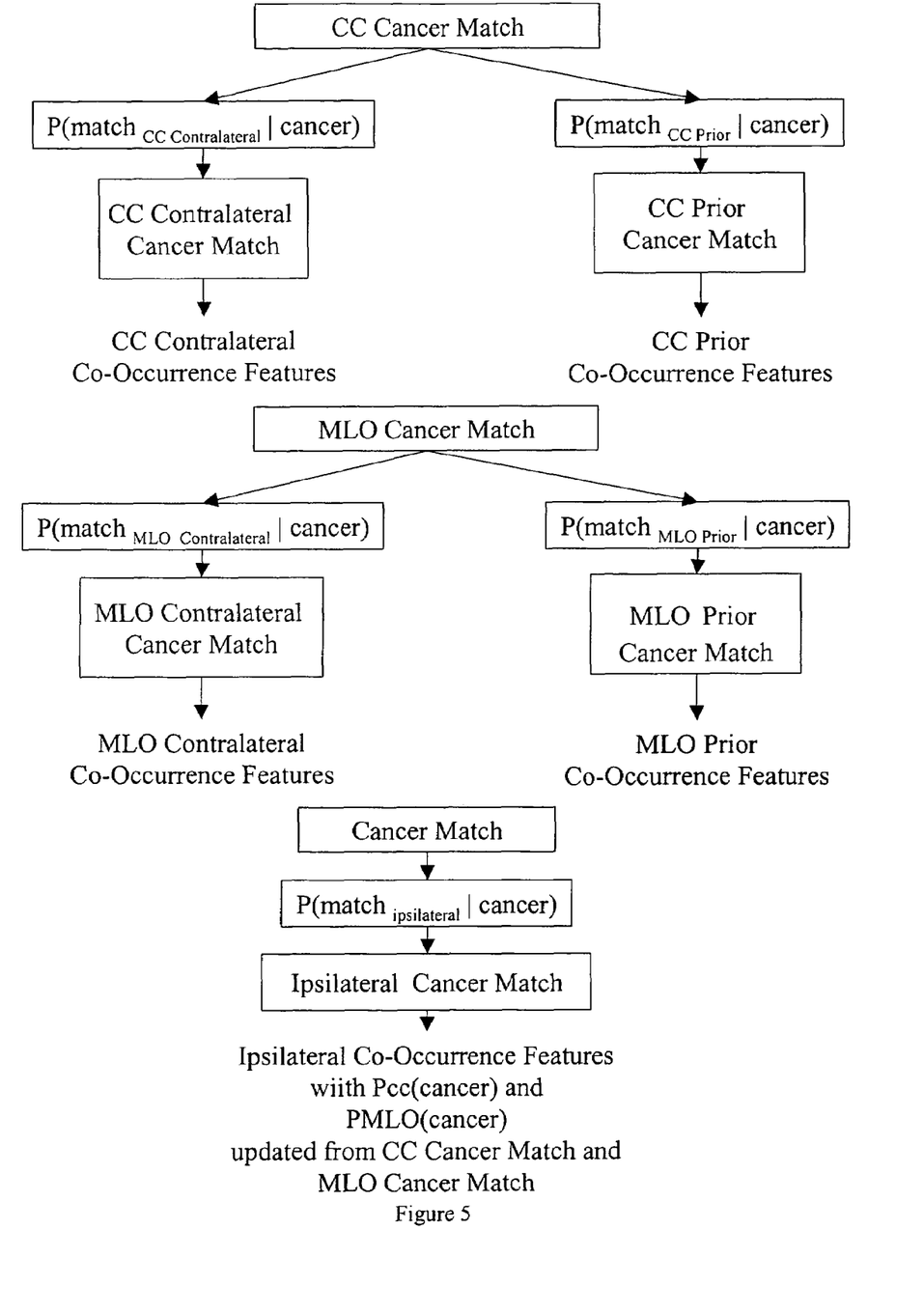
FIG. 5 shows Bayesian Belief network topologies for alternate embodiments according to an embodiment of the present invention.

FIG. 5 provides an alternative embodiment of a Bayesian Belief network topology for multi-image fusion. In this embodiment, the CC and MLO ROIs probabilities of cancer are updated with their contralateral and prior evidence before completing ipsilateral fusion. These probability calculations are identical to those discussed above in FIG. 3, except that the discriminant value for the ipsilateral co-occurrence shown in FIG. 4 uses updated CC and MLO probabilities of cancer for the evidence assignment. This topology is also beneficial, since the CC and MLO ROIs can provide maximum information about the case before the ipsilateral matching is evaluated.

Generation of Evidence

This section discusses how the raw feature data is transformed into evidence for use in the Bayesian Belief network. Two primary steps are needed to generate the evidence. These steps are:

Transforming the raw feature data, and

Generating evidence from feature pairs using co-occurrence matrices.

Figure 6A:
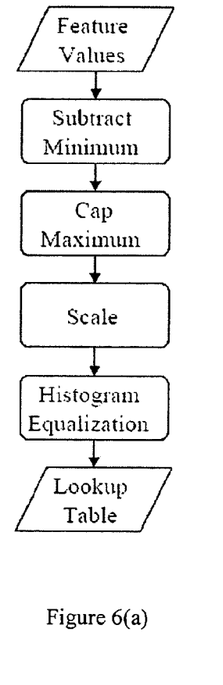
FIG. 6 illustrates the feature transformation method and function of the present invention.
Figure 6B:
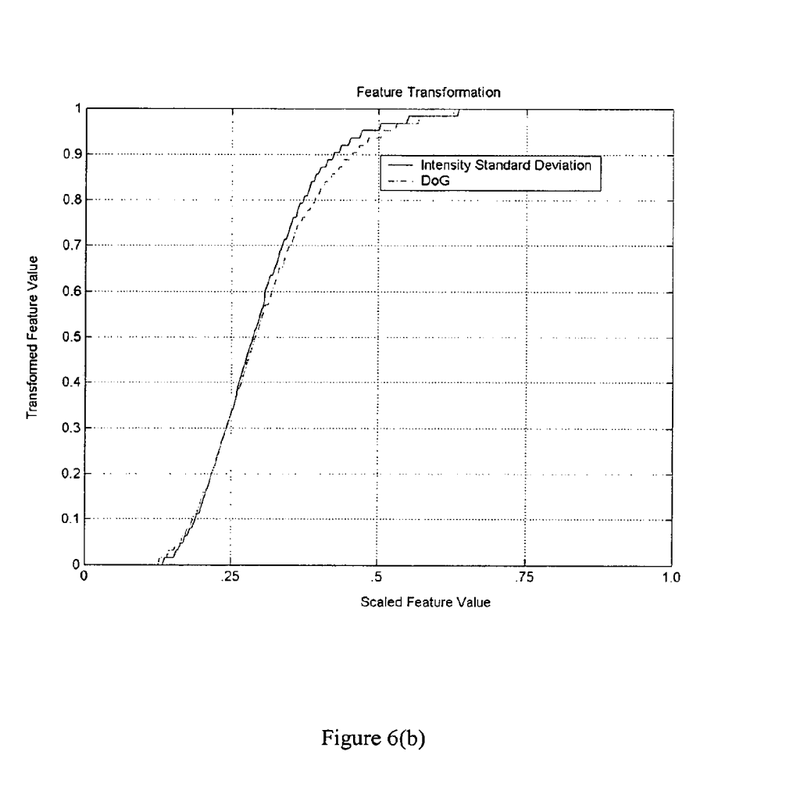
Figure 7:
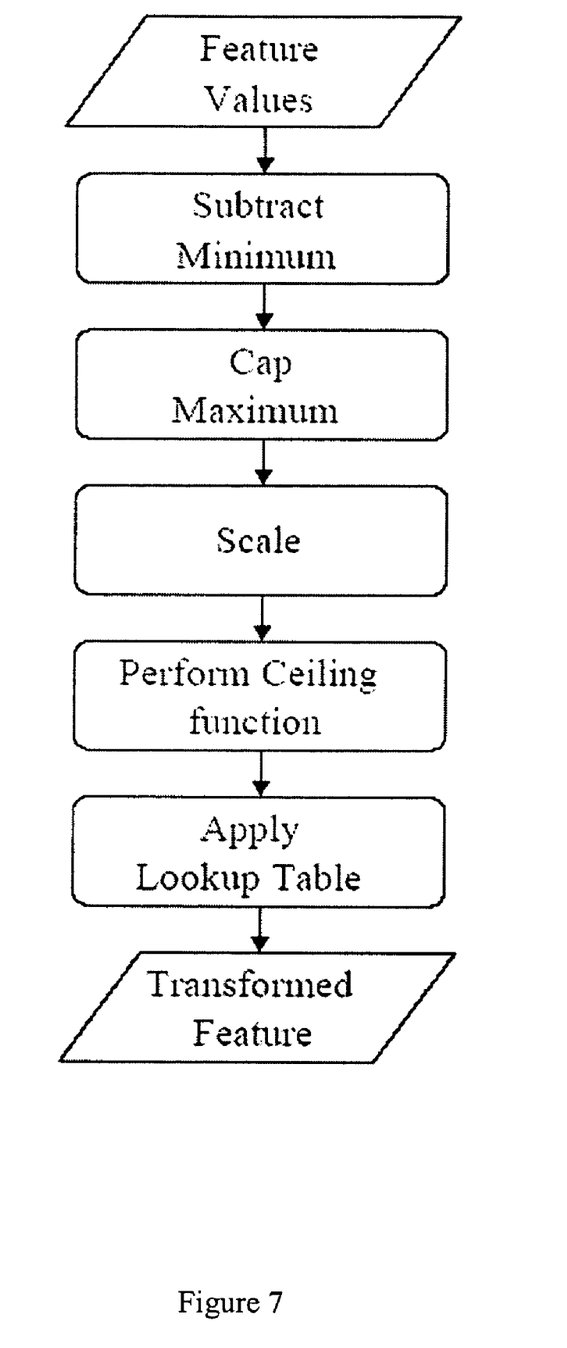
FIG. 7 is a block diagram showing application of the feature transformation method according to an embodiment of the present invention.

The primary goal of the feature transformation is to discretize the feature measurements. To accomplish this goal, reasonable quantization bins must be selected. Reasonable, in this case, is synonymous with each quantization bin having a substantially equivalent number of observations. FIG. 6 shows a block diagram for the quantization process. First, a lower threshold is subtracted from the feature values. If any negative values result from this operation, the values are set to zero. This is done to shift the data to a zero minimum value. Then, an upper threshold clipping process is performed to cap the largest possible feature value. The feature values are then divided by that maximum value to constrain the features to a range [0,1]. The last step is to perform histogram equalization to define a transformation function look-up table (LUT) as shown in FIG. 6(b). Once the transformation function LUT has been generated, the online feature transformation process is executed as shown in FIG. 7. This is a similar process except in the final step the feature transformation LUT is applied to obtain the desired transformed feature value.

Feature Co-Occurrence

A co-occurrence matrix assigns evidence based on feature values associated with a matched ROI. The input is an n level quantization of transformed feature values with range of [0,1]. The form of the co-occurrence matrix is shown in Table 1. The quantized feature values from the two ROIs are used to index into the matrix to obtain the evidence associated with the matched ROI for that specific feature. The value of the evidence depends on the matched ROI source images. The three different image matching configurations are:

Ipsilateral—CC vs. MLO on same side;

Contralateral—Opposite side, common view, and

Prior—Current exam vs. prior exam of the same breast and view

TABLE 1

| | ROI 1 | | | |
|---|---|---|---|---|
| ROI 2 | $X_a(1)$ | $X_a(2)$ | ... | $X_a(n)$ |
| $X_b(1)$ | $e_{11}$ | $e_{12}$ | ... | $e_{1n}$ |
| $X_b(2)$ | $e_{21}$ | $e_{22}$ | ... | $e_{2n}$ |
| . | . | . | ... | . |
| . | . | . | | . |
| . | . | . | | . |
| $X_b(n)$ | $e_{n1}$ | $e_{n2}$ | ... | $e_{nn}$ |

Figure 8A:
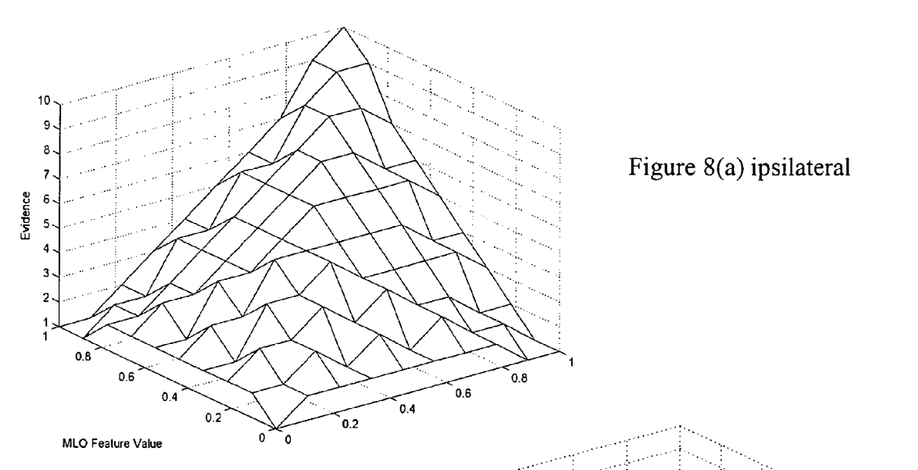
FIG. 8 depicts co-occurrence evidence matrices according to an embodiment of the present invention.

Each of the image matching configurations uses a predetermined co-occurrence matrix to exploit the expected variations associated with a cancerous lesion. Preferred embodiments of the co-occurrence matrices are shown in FIG. 8.

For ipsilateral ROI matching, consistent feature values are treated as indicative of increased suspiciousness of malignancy. Therefore, for a specific ROI feature value, the evidence is maximized when the matching ROI has the same quantized value. In addition, the larger feature values are assumed to be more likely associated with cancer. Assigning higher evidence values for larger feature values captures this phenomena. Jointly applying these two factors provides the ipsilateral co-occurrence matrix shown in FIG. 8(a).

Figures 8B, 8C:
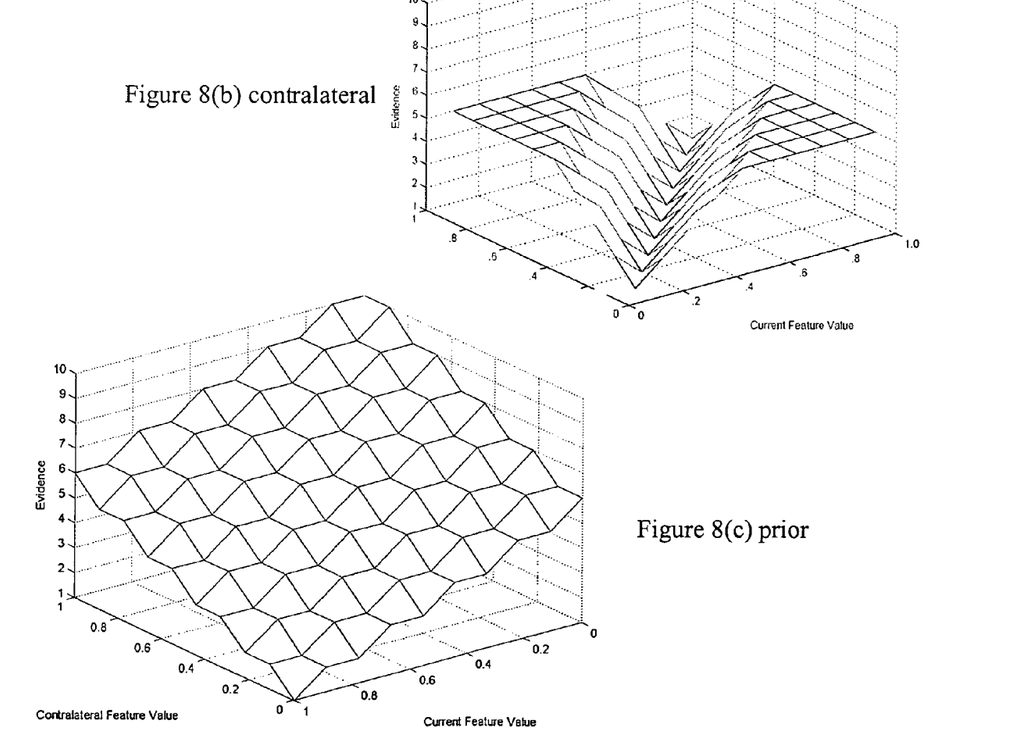

Contralateral ROI matching, on the other hand, should never cause an ROI to appear more suspicious. It should only reduce suspicion because the contralateral matching ROI is assumed to be located on normal tissue. Therefore, if a contralateral matched ROI has similar feature values, it is likely the result of normal symmetric breast structure. We correspondingly assign low evidence values to such events. If the ROIs have very different values, they are not likely the result of similar tissue and, therefore, are not considered a tissue match. Lack of a tissue match results in neutral evidence, which should not impact level of suspicion. The resulting contralateral co-occurrence matrix is shown in FIG. 8(b).

When matching potentially cancerous regions from a prior exam to a current exam, it is expected there will be some degree of lesion growth over the particular time interval. Therefore, an increase in feature values, from prior to current exams, should result in higher evidence values. Similarly, no growth should result in neutral evidence. Also, higher feature values for the current ROI should result in higher evidence levels. Factoring these considerations into the prior co-occurrence matrix results in the matrix shown in FIG. 8(c).

Since the time interval between current and prior examinations is related to the expected size difference observed in a growing lesion, the prior co-occurrence matrix must adapt for various time intervals between examinations. It is desirable to specify several prior co-occurrence matrices, each specific to a corresponding time interval between examinations. For short time intervals, such as three-six months, it is expected that a lesion will not have grown much; here even small increases in feature values result in larger evidence values. Conversely, if the time duration is three years then same small increase in feature values results in smaller evidence values than those obtained when the interval was three-six months.

Bayesian Network Training Requirements

Figure 9:
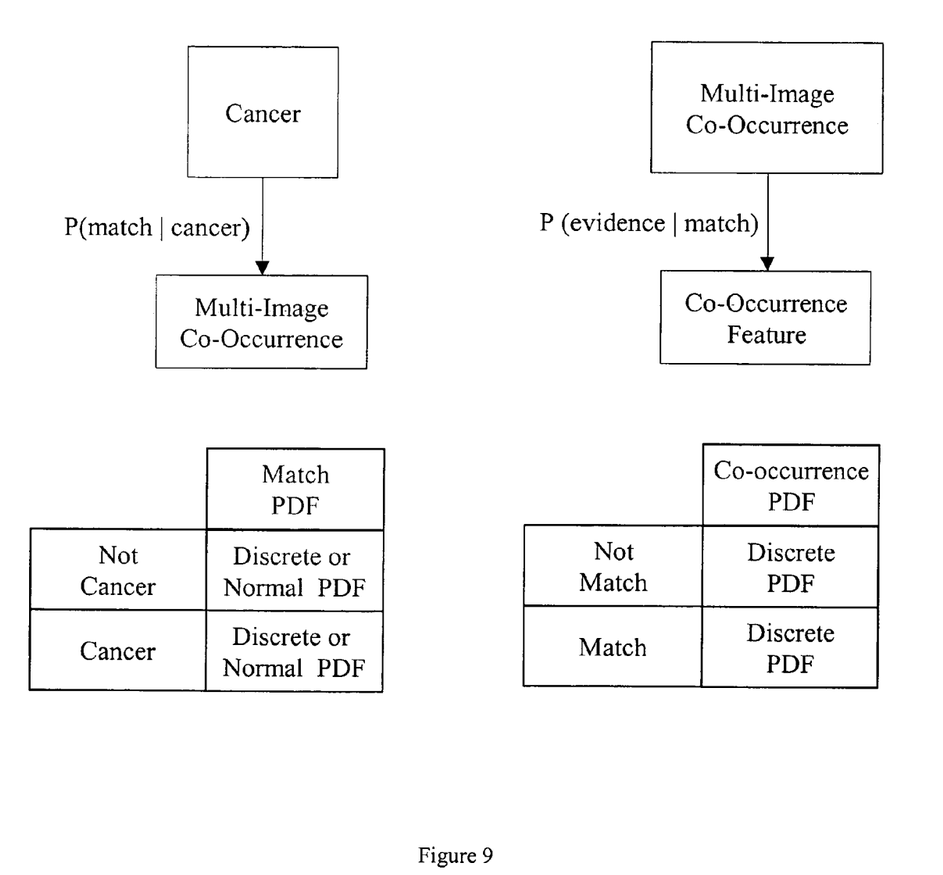
FIG. 9 shows Bayesian Belief network training blocks according to an embodiment of the present invention.

Classical Bayesian system models require a significant amount of data to train because there are so many conditional probabilities required. Bayesian Belief Networks simplify the training by requiring only the conditional probabilities between the state of the child node given the state of the parent node. The Bayesian Belief Network topologies shown in FIGS. 3 and 4 are broken down into single stage parent-child nodes in FIG. 9. Additionally, FIG. 9 displays probability tables that need to be determined for each parent-child combination. Along each table row, a probability density function (PDF) is required. The PDFs can be discrete or continuous. If discrete, any valid PDF can be specified. However, if the PDF is continuous, it must be a Normal density function.

Figure 10:
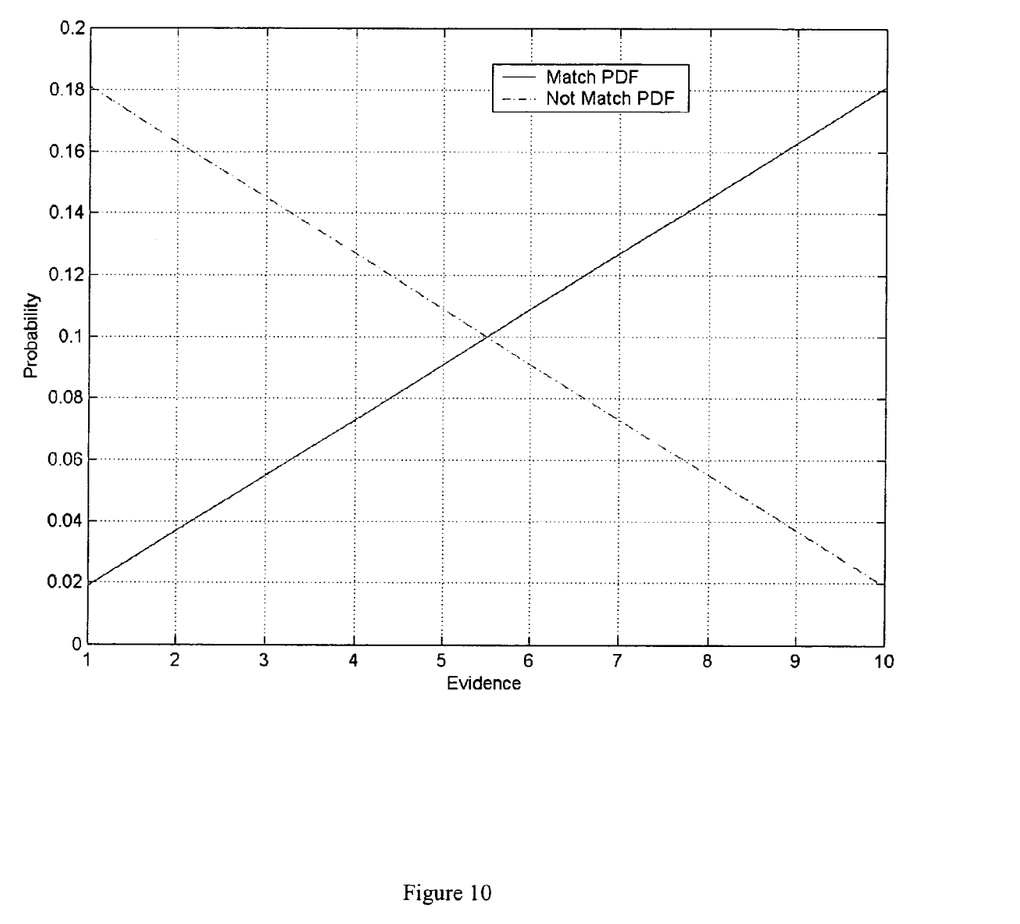
FIG. 10 is a plot of feature co-occurrence match probability density functions according to an embodiment of the present invention.

For multiple image fusion, discrete PDFs will be used. While the actual form of the PDF may change, it is desirable for the PDFs to have nearly equal values in case of neutral evidence, near the center of the PDF. This is important because neutral evidence should not have much, if any, impact on the match probability. Examples of feature co-occurrence match PDFs are shown in FIG. 10.

Example Results

Figure 11A:
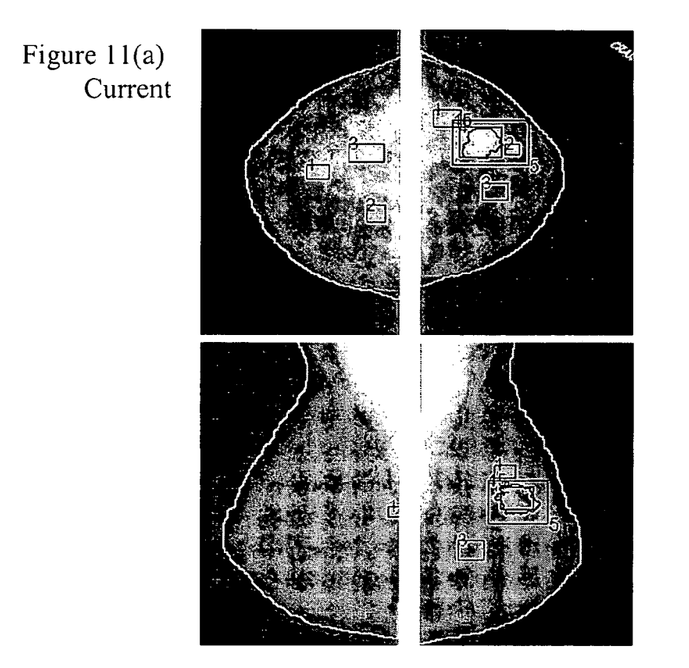
FIG. 11 shows example CAD results produced by the method and system according to an embodiment of the present invention.
Figure 11B:
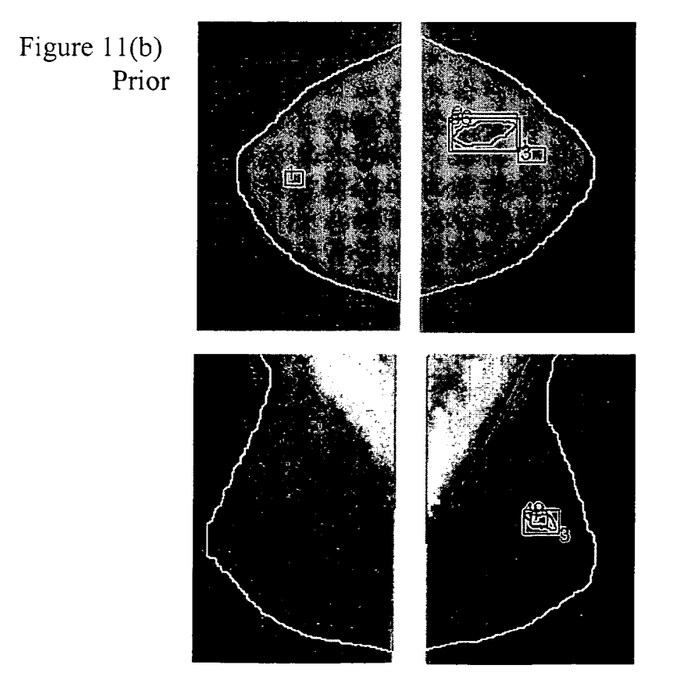

This section demonstrates multiple image fusion on an example case. The images of current and prior exams are shown in FIGS. 11(a) and 11(b) with the original single image CAD detections indicated. Information about each of these detections is presented in Table 2 for the current exam and Table 3 for the prior exam. Image numbers 1 to 4 in the tables correspond to the right cranio-caudal view (RCC), the left cranio-caudal view (LCC), the right medial-lateral oblique view (RMLO) and the left medial-lateral oblique view (LMLO) respectively. The ROI numbers correspond to the detection numbers displayed near the detections for that image. A detailed analysis will be presented first for a single match, followed by a less detailed analysis for the remaining ROIs in the case.

Detailed Analysis

Table 4 contains all the information necessary to calculate the fused multi-image match probability for ROI 1, in Image 1, shown in Table 2. For each feature used there is a current and prior raw and transformed feature value. The transformation is performed using the method described in the feature transformation section. The CAD probability requires no transformation because it is already in the [0,1] range of values. Other features used include Detector Response, Homogeneity, and Spiculation Response. The evidence column is generated from a quantized version of the transformed features of the current and prior ROI, which are used to index the co-occurrence matrix shown in FIG. 8(c). These evidence values are then input to the Bayesian Belief Network feature nodes, shown in FIG. 4.

TABLE 2

| Image | ROI | Orig Prob | Nipple Distance | Nipple Angle | Ipsilat Match | Prior Match | Fused Prob |
|---|---|---|---|---|---|---|---|
| 1 | 1 | 0.23031 | 3.2169 | 0.83249 |   | 1 | 0.044458 |
| 1 | 2 | 0.08288 | 6.4931 | 26.875 |   |   | 0.08288 |
| 1 | 3 | 0.11933 | 5.5079 | −12.649 |   |   | 0.11933 |
| 2 | 1 | 0.05219 | 6.1415 | 25.403 | 2 |   | 0.003136 |
| 2 | 2 | 0.2542 | 2.6127 | 12.076 |   | 1 | 0.13298 |
| 2 | 3 | 0.79077 | 4.1117 | −35.31 | 2 |   | 0.683495 |
| 2 | 4 | 0.96352 | 4.1389 | 13.968 | 2 | 2 | 1.00000 |
| 3 | 1 | 0.75729 | 8.1237 | −20.69 |   |   | 0.75729 |
| 4 | 1 | 0.34528 | 6.8783 | 57.012 | 1 |   | 0.14149 |
| 4 | 2 | 0.96337 | 5.0838 | 51.161 | 4 | 1 | 1.00000 |
| 4 | 3 | 0.6891 | 5.2921 | 4.4456 | 1 |   | 0.080844 |

TABLE 3

| Image | ROI | Orig. Prob. | Nipple Distance | Nipple Angle |
|---|---|---|---|---|
| 1 | 1 | 0.4832 | 2.611 | 17.75 |
| 2 | 1 | 0.2996 | 2.7268 | 4.4468 |
| 2 | 2 | 0.46572 | 4.8693 | 19.226 |
| 4 | 1 | 0.83424 | 4.5243 | 61.081 |

TABLE 4

| Feature Name | Exam | Raw Value | Trans. Value | Evidence | $p(e_{ij},m_i|c_1)$ | $p(e_{ij},m_i|c_0)$ |
|---|---|---|---|---|---|---|
| CAD Prob. | current | 0.23031 | 0.23031 | 4 | 0.072727 | 0.12727 |
|  | prior | 0.4832 | 0.4832 |  |  |  |
| Detector Response | current | 36.642 | 0.031746 | 4 | 0.072727 | 0.12727 |
|  | prior | 69.621 | 0.42857 |  |  |  |
| Homo. | current | 46.837 | 0.079365 | 5 | 0.090909 | 0.10909 |
|  | prior | 57.733 | 0.2381 |  |  |  |
| Spic. Response | current | 76435 | 0.53968 | 4 | 0.072727 | 0.12727 |
|  | prior | 100050 | 0.80952 |  |  |  |
| $p(e_i,m_i|c_k)$ |  |  |  |  | 3.497e-5 | 22.49e-5 |
| $p(c_k|e_i,m_i)$ |  |  |  |  | 0.13457 | 0.86543 |
| $p(c_k|E,M,CAD)$ |  |  |  |  | 0.044458 | 0.95554 |

The feature likelihoods associated with each feature, are determined by indexing the PDFs, shown in FIG. 10, with the evidence. These likelihoods are shown in the last two columns of Table 4. They are the evidence match likelihood given the cancer state, $p(e_{ij}, m_i|c_k)$, where $m_i$ is match i (such as prior match), $e_{ij}$ is the evidence associated with feature j, for match and $c_k$ is the cancer state (k=0 for not cancer and k=1 for cancer). The three bottom rows of the table relate to combined information. First, the fused match evidence likelihoods are generated by taking the product of the individual feature likelihoods, as shown in equation 2:

$$p(e_i, m_i \mid c_k) = \prod_j p(e_{ij}, m_i \mid c_k) \qquad (2)$$

where $e_i$ is the set of all feature evidence for match i.

The probability of cancer state, given the match evidence, is found by applying Bayes' rule:

$$p(c_k \mid e_i, m_i) = \frac{p(e_i, m_i \mid c_k) P(c_k)}{p(e_i, m_i \mid c_0) P(c_0) + p(e_i, m_i \mid c_1) P(c_1)} \qquad (3)$$

where $P(c_0)$ and $P(c_1)$ are the prior probabilities for the cancer state. For all calculations, these probabilities are assumed to be equal, $P(c_0)$ and $P(c_1)=0.5$.

An alternate form of equation 3, which fuses across the different matches ipsilateral, contralateral and prior:

$$p(c_k \mid E, M) = \frac{\prod_{i=1}^{n} p(e_i, m_i \mid c_k) P(c_k)}{\prod_{i=1}^{n} p(e_i, m_i \mid c_0) P(c_0) + \prod_{i=1}^{n} p(e_i, m_i \mid c_1) P(c_1)} \qquad (4)$$

where E is the collection of evidence values and M is the set of all match types.

The final step fuses the single image CAD probability with the cancer match probabilities:

$$p(c_k \mid E, M, CAD) = \frac{p(c_k \mid E, M) p(c_k \mid CAD)}{p(c_0 \mid E, M) p(c_0 \mid CAD) + p(c_1 \mid E, M) p(c_1 \mid CAD)} \qquad (5)$$

where $p(c_k \mid CAD)$ is the probability of cancer state from the single image CAD for either of the ROIs in the ipsilateral match. This equation is valid assuming $P(c_0)=P(c_1)=0.5$ and that $p(c_k \mid E, M)$ and $P(c_k \mid CAD)$ are conditionally independent.

Full Case Analysis

Table 2 contains additional information associated with the primary review exam. This table shows the index of the states of the best ipsilateral and prior ROI matches for each ROI in the current exam as well as updated probability of cancer values for each ROI using multiple image fusion. The numbers in the Ipsilat Match and Prior Match columns list the ROI number on the ipsilateral or prior image to which the current ROI is matched. In situations with multiple potential matches, the best match is selected based on a comparison of the features.

ROI feature values are normalized and quantized prior to processing as described above. Matched ROIs are then applied to a co-occurrence matrix to obtain evidence. The evidence is then converted to a probability of matched cancer state using the PDFs as shown in FIG. 10. The evidence values for this example are shown in Tables 5 and 6. The feature columns are associated with the initial CAD cancer probability, detector response, homogeneity of the ROI, and the level of spiculation.

TABLE 5

Cancer Match Likelihood Evidence

| | | Ipsilateral | | | | Prior | | | |
|---|---|---|---|---|---|---|---|---|---|
| Image | ROI | Prob | Detector | Homo | Spic | Prob | Detector | Homo | Spic |
| 1 | 1 | | | | | 0.07272 | 0.07272 | 0.09090 | 0.07272 |
| 2 | 1 | 0.01818 | 0.03636 | 0.07272 | 0.16364 | | | | |
| 2 | 2 | | | | | 0.1090 | 0.12727 | 0.07272 | 0.05454 |
| 2 | 3 | 0.12727 | 0.07272 | 0.07272 | | | | | |
| 2 | 4 | 0.18182 | 0.18182 | 0.14545 | 0.18182 | 0.14545 | 0.10909 | 0.09090 | 0.10909 |
| 4 | 1 | 0.03636 | 0.05454 | 0.0909 | 0.16364 | | | | |
| 4 | 2 | 0.18182 | 0.18182 | 0.14545 | 0.18182 | 0.12727 | 0.10909 | 0.14545 | 0.10909 |
| 4 | 3 | 0.03636 | 0.05454 | 0.0909 | 0.07272 | | | | |

TABLE 6

Normal Match Likelihood Evidence

| | | Ipsilateral | | | | Prior | | | |
|---|---|---|---|---|---|---|---|---|---|
| Image | ROI | Prob | Detector | Homo | Spic | Prob | Detector | Homo | Spic |
| 1 | 1 | | | | | 0.12727 | 0.07272 | 0.1090 | 0.12727 |
| 2 | 1 | 0.18182 | 0.16364 | 0.12727 | | | | | |
| 2 | 2 | | | | | 0.090909 | 0.07272 | 0.12727 | 0.14545 |
| 2 | 3 | 0.07272 | 0.12727 | 0.12727 | | | | | |
| 2 | 4 | 0.018182 | 0.018182 | 0.054545 | 0.018182 | 0.054545 | 0.09090 | 0.10909 | 0.10909 |
| 4 | 1 | 0.16364 | 0.14545 | 0.10909 | 0.036364 | | | | |
| 4 | 2 | 0.018182 | 0.018182 | 0.054545 | 0.018182 | 0.07272 | 0.09090 | 0.054545 | 0.09090 |
| 4 | 3 | 0.16364 | 0.14545 | 0.10909 | 0.12727 | | | | |

The probability of a cancer match for each matched ROI is obtained using equation 4, where $p(e_i, m_i|c_k)$, from equation 2, fuses the individual feature probabilities for image match $m_i$ (prior, ipsilateral, etc.). The updated probability of cancer, given the CAD and cancer match probabilities, is obtained using equation 5. Performing this calculation for the ROI 1 on image 1, we obtain a probability of cancer given the match of 0.044458, which matches the fused probability in table 2. It is important to note that these calculations were done in double precision. Using only the precision shown in these tables results in significant round-off error. The general trend observed in this example is that cancer matches tend to have increased probability of cancer whereas the false positives tend to have reduced probability of cancer.

It is noted that terms like "preferably," "commonly," "traditionally," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. A method for obtaining evidence useful in mammographic computer-aided detection systems comprising:
   processing a pair of images with a computer-aided detection system producing a set of regions of interest associated with each image;
   selecting a first region of interest from the first image in the pair;
   identifying a matched region of interest in the second image of the pair;
   obtaining single image feature values from said first region of interest in said first image and said matched region of interest in said second image;
   producing a pair of integers for each element by transforming each feature value to an integer value; and
   selecting an element from at least one predetermined co-occurrence matrix defined by the pair of integers to provide an evidence value for the first region of image.

2. The method of claim 1 wherein said pair of images are views of the same breast in a mammographic examination.

3. The method of claim 2 wherein said pair of images are the cranio-caudal and medial-lateral oblique views of a breast.

4. The method of claim 2 wherein identifying a matched region of interest is based on substantially equivalent distances from the nipple to each of the regions of interest.

5. The method of claim 1 wherein said first image is from a current examination and said second image is from a prior mammographic examination of the same breast and same view.

6. The method of claim 5 wherein identifying a matched region of interest is based on substantially equivalent distances and angles from the nipple to each of the regions of interest.

7. The method of claim 1 wherein said pair of images is from the same view of both the left breast and the right breast in a mammographic examination.

8. The method of claim 7 wherein identifying a matched region of interest is based on substantially equivalent distances and angles from the nipple to each of the regions of interest.

9. The method of claim 1 further comprising:
   providing the evidence value as an input to a Bayesian Belief Network; and
   estimating the likelihood of malignancy score for said first region of interest.

10. The method of claim 9 wherein said Bayesian Belief Network utilizes a probability density function along each row of each parent-child combination.

11. The method of claim 9 wherein said Bayesian Belief Network utilizes a discrete probability density function.

12. The method of claim 9 wherein said discrete probability density function is nearly equal value for neutral evidence near the center of said discrete probability density function.

13. The method of claim 9 wherein said at least one predetermined co-occurrence matrices correspond to the set comprising ipsilateral images, contralateral images, and prior images.

14. The method of claim 9 wherein said likelihood of malignancy score, given said match evidence value, is obtained by applying the Bayes' Rule with fusing individual feature probabilities for an image match to produce cancer match probabilities and fusing said cancer match probabilities with a single image computer-aided detection probability.

15. The method of claim 1 wherein the co-occurrence matrix is based on features from one of computer-aided detection system probability, density detector response, homogeneity, spiculation response, or combinations thereof.

16. The method of claim 1 wherein the co-occurrence matrix is based on features from one of computer-aided detection system probability, microcalcification detector response, number of microcalcifications or combinations thereof.

17. The method of claim 1 wherein producing further comprising:
   generating a feature transformation function table.

18. The method of claim 17 wherein generating a feature transformation function table comprises:
   obtaining a raw feature value from a computer-aided detection system;
   subtracting a minimum threshold value from said raw feature value;
   setting any negative said subtracted feature value to zero;
   clipping said subtracted feature value to an upper threshold value by capping the largest possible feature value;
   constraining said feature value between one and zero by dividing by said largest possible feature value; and
   defining a feature translation function look-up table by performing histogram equalization.

19. The method of claim 18 further comprising:
generating a transformed feature in order to discretize the feature measurements.

20. The method of claim 19, wherein generating a transformed feature in order to discretize the feature measurements comprises:
obtaining raw feature values from a computer-aided detection system;
subtracting a minimum threshold from said raw feature value;
setting all negative said subtracted feature values to zero;
clipping said subtracted feature value to an upper threshold value by capping the largest possible feature value;
constraining said feature values between one and zero by dividing by said largest possible feature value; and
applying a feature translation function look-up table to produce said transformed feature.

21. A method for specifying a co-occurrence matrix for current and prior mammographic examinations wherein:
increasing evidence values where feature values from a prior examination to a current examination increase;
assigning neutral evidence values where feature values from a prior examination to a current examination have equivalent values; and
setting higher evidence values where there are relatively large feature values for a current region of interest.

22. The method of claim 21 wherein co-occurrence matrices are functions of the time interval between said current examination and said prior examination.

23. A method for specifying a co-occurrence matrix for ipsilateral mammographic examinations wherein:
increasing evidence values for consistent feature values from one view to another view; and
increasing evidence values for increased feature values from one view to another view.

24. A method for specifying a co-occurrence matrix for contralateral mammographic examinations wherein:
decreasing evidence values for similar feature values from one breast to the other breast; and
assigning neutral evidence values for different feature values from one breast to the other breast.

25. A system for obtaining evidence useful in mammographic computer-aided detection systems, the system comprising:
a computer-aided detection system for processing a pair of images and producing a set of regions of interest associated with each image; and
a processor for receiving said pair of images and selecting a first region of interest from the first image in the pair and identifying a matched region of interest in the second image of the pair from said first region of interest in said first image and said matched region of interest in said second image wherein said processor obtains a single image feature values and produces a pair of integers for each element by transforming each feature value to an integer value, and selecting an element from at least one predetermined co-occurrence matrix defined by the pair of integers to provide an evidence value for the first region of image.

* * * * *